United States Patent
Kraft et al.

(10) Patent No.: US 7,627,094 B2
(45) Date of Patent: Dec. 1, 2009

(54) SELECTIVE RESPONSE TELEPHONE ANSWERING SYSTEM

(76) Inventors: Margareth V. Kraft, 320 Robin Hill Dr., Naperville, IL (US) 60540; Caroline M. Kraft, 1354 Fairfield Ct., Naperville, IL (US) 60565; Clifford H. Kraft, 320 Robin Hill Dr., Naperville, IL (US) 60540

( * ) Notice: Subject to any disclaimer, the term of this patent is extended or adjusted under 35 U.S.C. 154(b) by 842 days.

(21) Appl. No.: 11/129,981

(22) Filed: May 16, 2005

(65) Prior Publication Data

US 2005/0271188 A1    Dec. 8, 2005

Related U.S. Application Data

(60) Provisional application No. 60/575,892, filed on Jun. 1, 2004.

(51) Int. Cl.
H04M 1/64    (2006.01)
(52) U.S. Cl. .................. 379/76; 379/88.19; 379/88.23; 379/88.25; 379/142.01; 709/203; 709/224
(58) Field of Classification Search .............. 379/88.01, 379/88.13, 88.18, 93.28, 211.01, 84, 88.17, 379/88.19, 88.21, 88.25, 197, 265.02, 76, 379/88.23, 142.01; 455/411; 705/14; 709/203, 709/224
See application file for complete search history.

(56) References Cited

U.S. PATENT DOCUMENTS

| | | | |
|---|---|---|---|
| 5,278,894 A * | 1/1994 | Shaw ....................... 379/88.19 |
| 5,535,265 A * | 7/1996 | Suwandhaputra ........ 379/93.28 |
| 5,559,860 A | 9/1996 | Mizikovsky ................. 379/58 |
| 5,651,055 A * | 7/1997 | Argade .................... 379/88.01 |
| 5,963,626 A * | 10/1999 | Nabkel .................. 379/142.01 |
| 6,055,305 A * | 4/2000 | Norman et al. ......... 379/211.01 |
| 6,160,877 A * | 12/2000 | Tatchell et al. .............. 379/197 |
| 6,266,399 B1 * | 7/2001 | Weller et al. ............. 379/88.19 |
| 6,266,526 B1 * | 7/2001 | Kim ........................... 455/411 |
| 6,377,664 B2 * | 4/2002 | Gerszberg et al. ........ 379/88.13 |
| 6,751,298 B2 * | 6/2004 | Bhogal et al. ............ 379/88.13 |
| 6,785,379 B1 * | 8/2004 | Rogers et al. .......... 379/265.02 |
| 6,795,530 B1 * | 9/2004 | Gilbert et al. ................. 379/76 |
| 7,072,452 B1 * | 7/2006 | Roberts et al. ........... 379/88.23 |
| 7,333,595 B2 * | 2/2008 | Valco et al. .............. 379/88.25 |
| 7,466,804 B2 * | 12/2008 | Moore et al. ............. 379/88.25 |
| 2002/0010775 A1 * | 1/2002 | Rakavy et al. .............. 709/224 |
| 2002/0194064 A1 * | 12/2002 | Parry et al. .................... 705/14 |
| 2003/0005051 A1 * | 1/2003 | Gottlieb ...................... 709/203 |
| 2004/0091087 A1 * | 5/2004 | Kikinis .................... 379/88.17 |
| 2005/0105706 A1 * | 5/2005 | Kokkinen .............. 379/201.01 |
| 2005/0147212 A1 * | 7/2005 | Benco et al. .................. 379/84 |
| 2005/0201533 A1 * | 9/2005 | Emam et al. ............. 379/88.19 |
| 2007/0258567 A1 * | 11/2007 | Koch ....................... 379/88.21 |

* cited by examiner

Primary Examiner—Gerald Gauthier
(74) Attorney, Agent, or Firm—Clifford H. Kraft

(57) ABSTRACT

A telephone answering system and method for playing particular different greeting messages to different callers. When an incoming call is received, either caller-ID is decoded, or the caller's identification is determined some other way if possible, and if the particular caller's identification is on a list, a special message can be played for that caller if such a message as been stored and is active. Any other caller receives a different message, usually a default greeting message. Special messages can be date/time stamped to die or change after particular dates or times. Messages and caller identification can be loaded into the system remotely.

12 Claims, 3 Drawing Sheets ial patent application No. 60/575,892 filed Jun. 1, 2004. Application 60/575,892 is hereby incorporated by reference.

SELECTIVE RESPONSE TELEPHONE ANSWERING SYSTEM

This application is related to, and claims priority from, U.S. Provisional patent application No. 60/575,892 filed Jun. 1, 2004. Application 60/575,892 is hereby incorporated by reference.

BACKGROUND

1. Field of the Invention

The present invention relates generally to the field of answering systems and more particularly to a telephone answering system or answering machine with a user message that depends on caller-ID.

2. Description of the Prior Art

Telephone answering machines and answering systems automatically answer incoming telephone calls. After an introductory greeting message that usually greets the caller and tells him that the telephone owner is not available, the answering system usually accepts a message from the caller.

Prior art answering systems normally allow for the recording of one or more greeting messages. Low-end answering systems only hold one greeting message; some higher-end systems allow several messages to be recorded. However, on those systems with multiple message, the telephone owner is required to select the active greeting. All unselected greetings are unused until the owner at a later time selects one of them. At any time, the system is only capable of playing one pre-selected or pre-recorded greeting message.

Cellular telephone calls, when unanswered, normally are routed by the service provider to an answering service that acts very much like a conventional answering machine. The user receives a greeting message and is allowed to leave a message.

It would be advantageous to have a telephone answering system that chooses a greeting message based on an incoming caller-ID or caller's identity.

SUMMARY OF THE INVENTION

The present invention relates to a telephone answering system and method for playing particular different greeting messages to different callers. When an incoming call is received, either caller-ID is decoded, or the caller's ID is determined some other way if possible, and if the particular caller's ID is on a list, a special message can be played for that caller if such a message has been stored and is active. Any other caller normally receives a different message, usually a default greeting. Special messages can be date/time stamped to die or change after particular dates or times. Messages and caller-IDs can be loaded remotely.

The present invention is widely applicable to answering machines, private branch exchanges (PBXs), cellular providers with answering services, internet telephone systems including voice over IP and any other type of voice communication or telephony system.

Several drawings and illustrations have been presented to aid in the understanding of the present invention. The scope of the present invention is not limited to the figures.

DESCRIPTION OF THE INVENTION

The present invention relates to a telephone answering system that can play a greeting message based on caller-ID or any caller identification. This allows the telephone owner or account owner to program specialized greeting messages destined only for particular callers. For example, a telephone owner may want to alert members of his family of his whereabouts, but not announce this information to an arbitrary caller. The telephone owner could program a special greeting message like: "I have gone out to the grocery store—call me on my cell" that would be played only if members of his family or telephone numbers from a particular list of telephone numbers called, for example his wife and his brother. For the rest of the world, a standard greeting message would be played. Thus if the wife or brother called from their home or cellphone, the special message would be played, but incoming calls from other telephone numbers would receive the standard greeting message.

Figure 1:
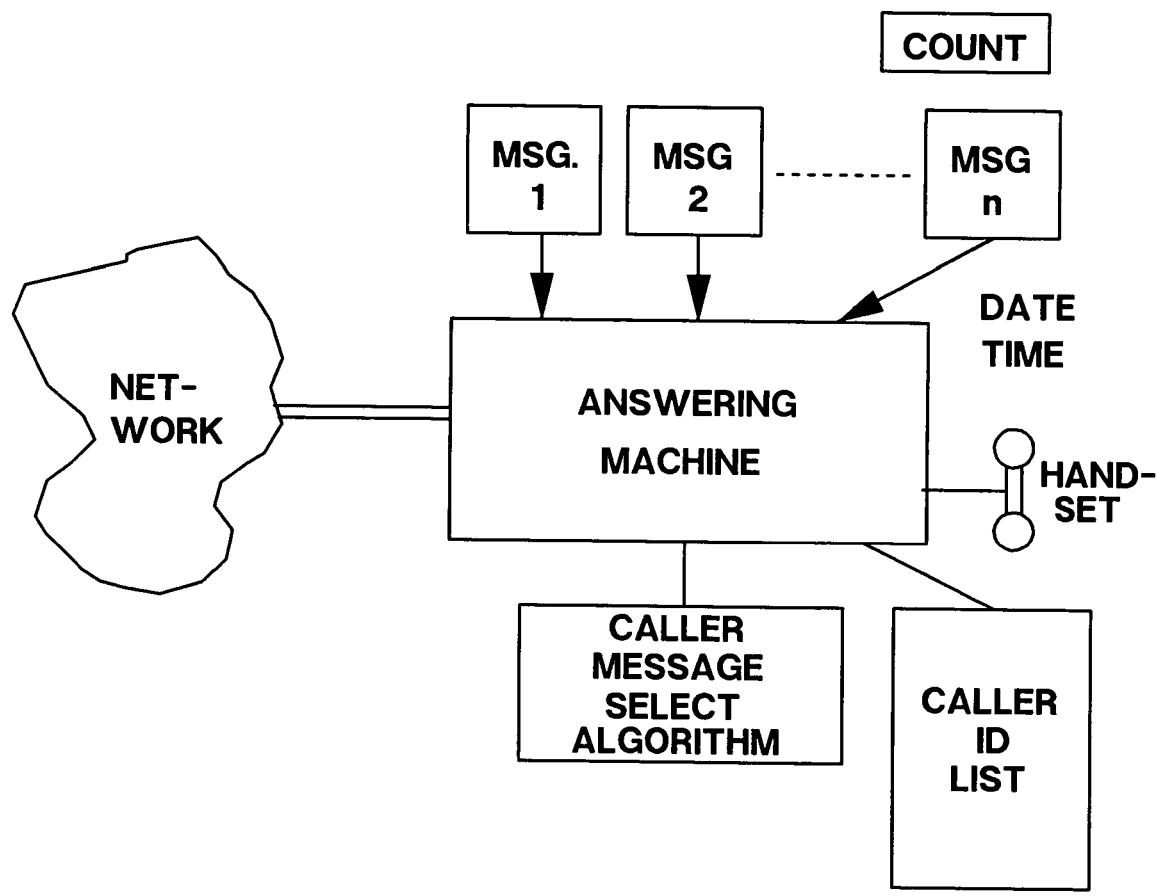
FIG. 1 shows a block diagram of an answering system with multiple greeting messages based on caller-ID.

FIG. 1 shows a block diagram of an embodiment of the present invention. An answering system is attached or coupled to a telephone line or to any telephone network in any way. The incoming telephone line or signal can be enabled to receive any type of caller-ID information. When a call comes in from the public switched telephone network (PSTN) or from a cellular network (if the answering system is associated with a cellular telephone), or from an ISDN network, voice over IP network, or any other telephone or voice network, caller-ID can be supplied or determined during ringing or shortly after answering. Any identification method used to identify the incoming caller is within the scope of the present invention including, but not limited to, caller-ID, caller name transmission, EIN or telephone identification, voice recognition and any other method.

As the answering system shown in FIG. 1 answers (after several unanswered rings), a message decision algorithm checks a list of "special" possible incoming telephone numbers or identifications. If the call has originated from any of these "special" numbers, i.e., friends, family, work associates, etc., the algorithm searches to see if there is a currently active special greeting message assigned to that particular calling number. If there is, a special greeting message can be played to the caller. Then the answering system can enter a standard mode and either record a message from the caller (normally after a beep), or execute any other standard answering machine feature.

If the caller-ID telephone number of the incoming call is not on the "special list", or if there is no currently active special message for that number, the answering system can default to a standard greeting or any other greeting or message, for example: "This is John Jones. I am not available to take your call. Please leave your telephone number, and I will return your call as soon as possible." However, if the telephone or account owner, in this case John Jones, was expecting a particular call from a work associate, Mr. Jones could assign a special message for that caller and make it currently active. It might sound like: "Hi Sam. I'm on my way into the office right now. You can call me on my cell, or I will be in the office by 2 PM." or any other suitable particular message.

An embodiment of the present invention such as that shown in FIG. 1 preferably runs on a microprocessor, micro-controller or embedded processor (however it can run on any processor). In particular, it can run on a processor provided by a cellular service provider. The processor normally executes a software program where instructions are executed sequentially to check if a particular caller-ID is on the "special" list or if there is a current greeting message for that caller-ID. In addition, it is preferred that messages can be stored digitally in compressed or uncompressed form; however, analog storage of messages using any means including tape is within the scope of the present invention. Compression techniques include MP1, MP2, MP3, ADPCM and any other compression technique. Messages and greetings can also be stored uncompressed. Digital messages can be stored in random access memory devices, flash memories, EEProm devices, disks, tapes, CDs, DVDs, or any other type of digital storage. Similar digital storage can be used to store the "special" list. The preferred method is to use a non-volatile storage device like a flash memory, disk or EEProm (or any non-volatile storage device) to store lists and messages. The answering system normally is equipped with a handset with all other equipment being placed inside or on a housing. The housing can optionally contain a display and keypad or keyboard. The device can contain all features of a standard answering machine known in the art.

Figure 2:
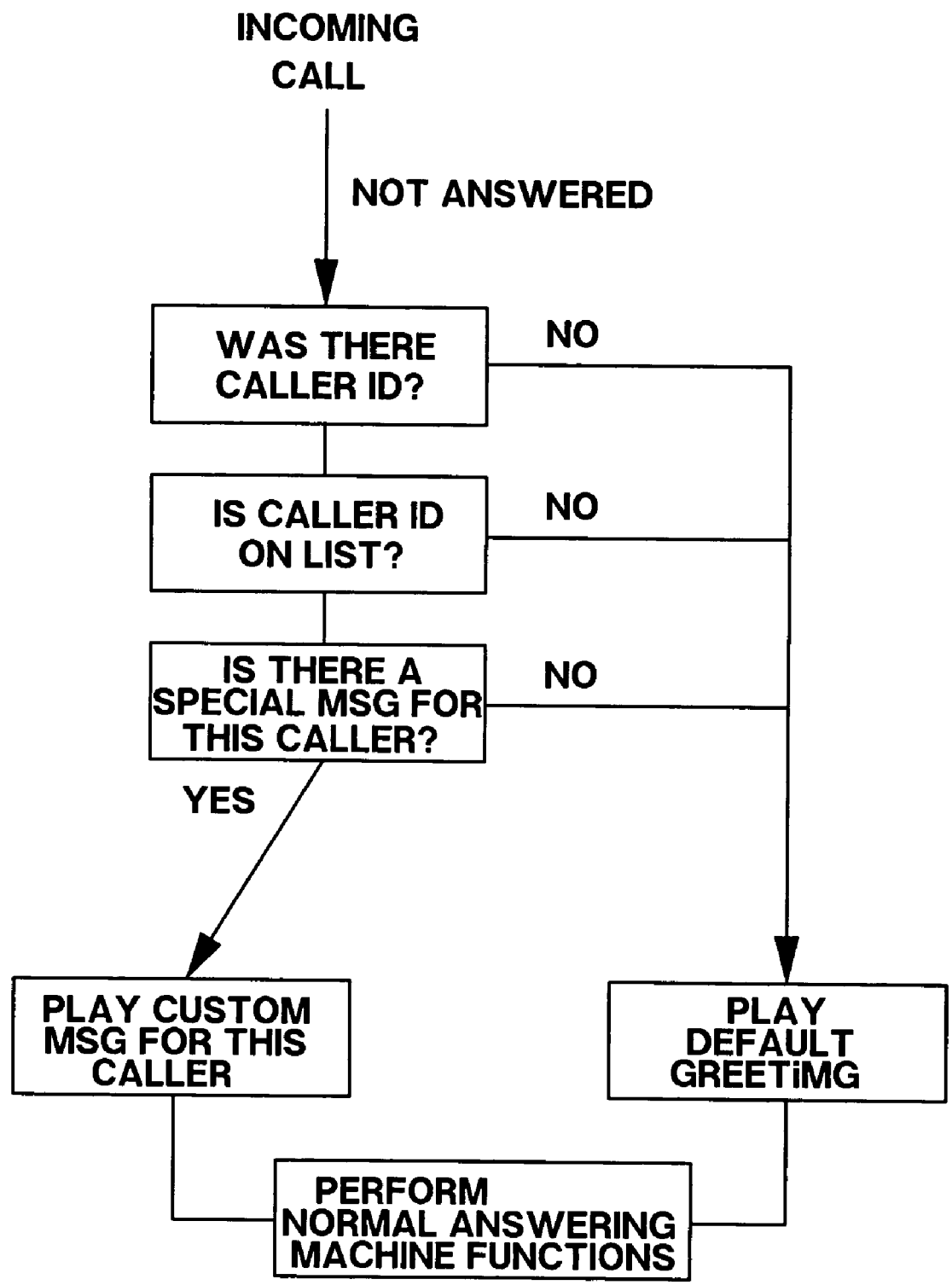
FIG. 2 shows a flowchart of a simple message decision algorithm.

FIG. 2 shows a flowchart of an algorithm of an embodiment of the present invention. Each incoming call can be checked to see if it contains caller-ID information. If it does, a "special" list can be checked to see if there is a current entry on the list. If there is a current entry of the calling number on the "special" list, an index of special messages can be checked (they can be stored or linked from the telephone number entry as is known in the art). If there is a current special message for that caller-ID, that message can be played as a greeting. If there is none, or the caller-ID is not on the list, the standard greeting or another message can be played. The answering system can then perform all normal answering functions including recording a message from the caller.

Because special messages can become obsolete, an optional feature of the present invention can be to "age" messages. With this optional feature, a special message can be given an end-date or end-time, or both. After that date or time (or both), the message can be marked as old or inactive. The telephone or account owner can optionally change any message from active to inactive and vice-versa. The telephone owner, when creating a special message, can optionally assign an "infinite" duration to a particular message if desired. An "infinite" duration would allow that special message to last for a particular caller until deleted or changed by the telephone owner.

It is also an optional feature of the present invention for a date/time duration to be placed on a particular caller-ID. After that particular date/time, the caller-ID could be automatically removed from the "special" list.

The present invention also allows the user to set up "special" lists and special greeting messages remotely by calling in, or accessing a web page, and entering a special code. Also, the present invention could recognize the owner's remote caller-ID (work number, cellphone) from a list of "owners call-in numbers" and immediately present a special menu to the owner. In this case, when the owner called the answering system from his own cellphone (for example when on a trip), the owner could receive a special owner's greeting and then be asked if he wanted to hear his recorded messages, add/change the special messages, add/change the "special" caller-ID list, make any special message active or inactive or perform any other answering machine feature. Other callers would not receive this special menu (special treatment). The entry into this menu could be password protected if desired. Voice recognition could also be used to identify the caller as the telephone or account owner.

For example, the owner might live in Chicago and be on an airplane trip to Dallas. Upon boarding the aircraft, an announcement is made that the plane will leave an hour late. The owner could phone his answering system from his cellphone, enter a special greeting for one or more selected people on the "special" list such as: "I have learned my plane will be an hour late into Dallas—that puts me in around 8 PM; I will return calls at that time." Only those callers on his "special" list would receive this greeting. The owner could further date/time stamp that message so that it disappears after 8 PM (or any other time).

Optionally, when a message disappears after it exceeds its date/time stamp (if it has one), instead of simply falling back to the standard default greeting, the system could fall back to a standard special greeting for that caller (or choose another special greeting). For example, the owner could have a standard special greeting for one of his friends (a greeting that is more personal than the unknown caller default greeting). In the plane example given above, the owner could place the new special message concerning the airplane on the list for his friend, but after 8 PM (or whatever the end time was), the greeting could drop back to the standard special greeting for that friend.

Any combination of greetings, chains of greetings with the same or different date or time stamps, fall back strategies, and any number of special greeting messages and "special" list entries are within the scope of the present invention. The owner could browse and listen to any of the recorded greetings or browse the "special" list either locally or remotely. Optionally, the owner could load, listen to, change any part of messages or the "special" list or lists from a data port such as the internet.

Alternate embodiments of the present invention can respond to a caller's name or voice rather than a caller-ID telephone number, or to a special message since some caller-ID systems can also supply names. Voice recognition is known in the art. An owner or caller could teach his answering system his particular voice. In addition, it is possible for the present invention to respond to "caller bypass" where there are special rings from calls from certain parties. The present invention also works with voice over IP, where the receiving data link can supply either the caller name, caller ID, caller's IP address or any other type of identification of the caller so that the present invention can identify the caller.

Another embodiment of the present invention allows switching between special messages based on the number of times a particular caller has called. For example, suppose the telephone owner is being called by a salesperson, and the owner wishes to be polite on the first call, but stronger on subsequent calls. The first call from that caller could be greeted for example by: "Hello, thank you for calling, but I am really not interested in your product this month—try again in about a month." A second call from the same caller sooner than a month could be greeted by a different message: "This is the second time you have called. I am not interested at this time." The third and subsequent calls could be greeted by: "You have called me several times. Please do not call again". This switching on count could be controlled by a simple call counter or could work out of a menu of possible permutations such as those described above. Responses might also be keyed on time or date. For example, the stronger message might only be invoked for subsequent calls within a 24 hour period or calls late at night. Programming of the various features of the present invention by the user could optionally be accomplished from a visual display on a cellphone or computer.

Figure 3:
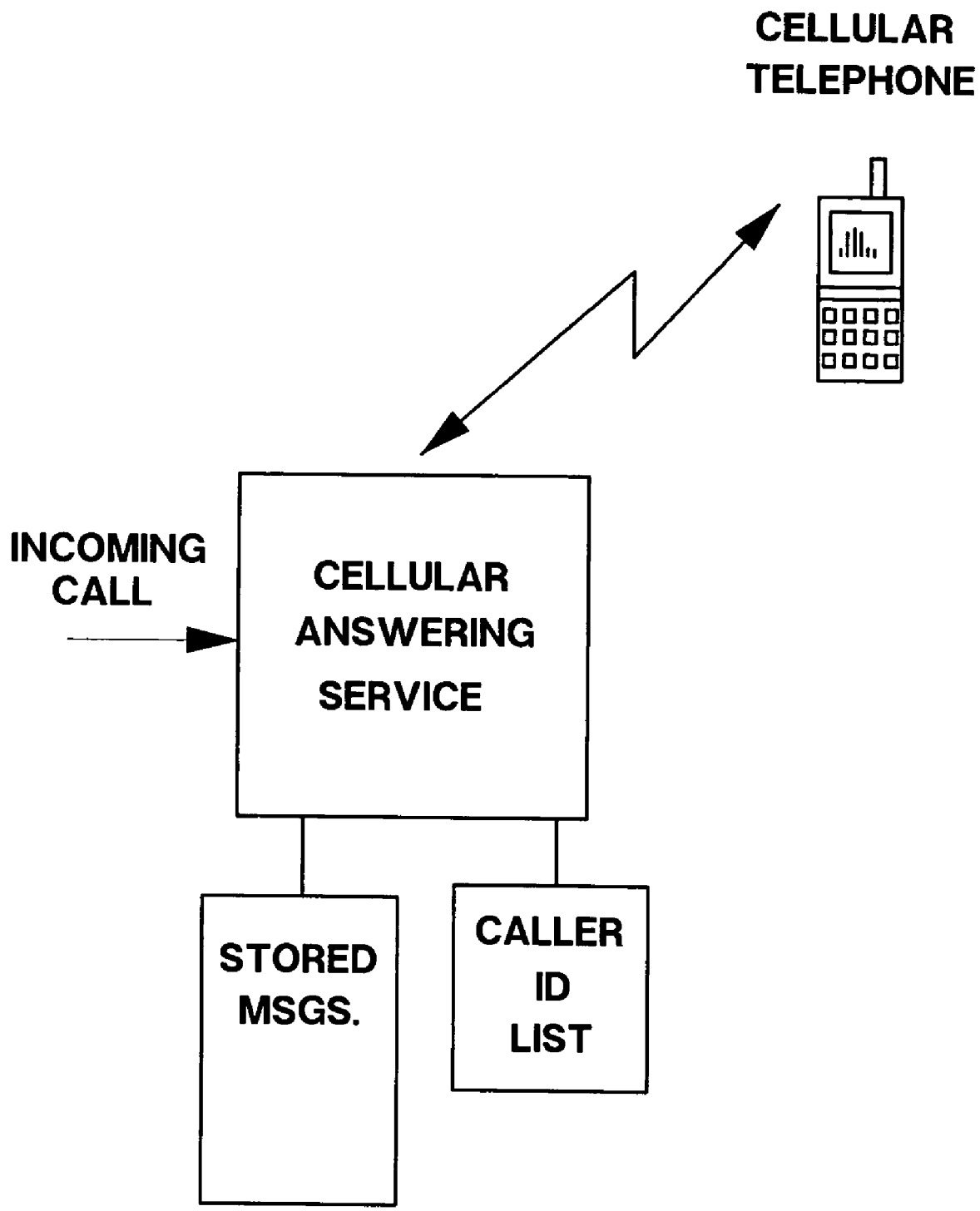
FIG. 3 shows an embodiment of the present invention used in the cellular telephone system.

FIG. 3 shows an embodiment of the present invention used by a cellular telephone provider to provide answering services.

Several descriptions and illustrations have been presented to better aid in the understanding of the present invention. One of skill in the art will realize that many changes and variations are possible. All such changes and variations are within the scope of the present invention.

We claim:

1. A method of providing selective greeting message in an answering system comprising:
   storing a plurality of different special greeting messages for a particular caller, said messages being sequentially ordered;
   answering an incoming telephone call;
   determining a caller identity;
   determining if a plurality of different greeting messages are stored for that caller, if so, playing a next sequential message each time an incoming call is received from said caller; otherwise,
   determining if a single particular message is stored for that caller; and playing said single particular message if a particular message is stored for that caller and playing a default message if no particular message is stored for that caller.

2. The method of claim 1 further comprising the step of a telephone owner remotely storing a particular message.

3. The method of claim 2 wherein said particular message is stored in said answering system from the internet.

4. The method of claim 1 further comprising storing a date/time stamp with said particular message.

5. The method of claim 4 wherein said particular message is not played if incoming call time is later than said date/time stamp.

6. A method of providing selective greeting messages on an answering system comprising: answering an incoming telephone call; determining caller identification if possible; using said caller identification, to determine if said caller is on a caller list; if said caller is on said caller list, determining if there is a special greeting message for that caller; if there is a special greeting message for that caller, playing that special greeting message, otherwise playing a default message, and wherein said special message for said caller is downloaded onto said answering system from a remote computer over the internet.

7. The method of claim 6 further comprising setting a date/time stamp on said special greeting message, whereby said special greeting message will not be played after said date or time.

8. The method of claim 6 further comprising the steps of: storing a plurality of different special greeting messages for said caller, said plurality of different special greeting messages being sequentially ordered; playing each of said sequentially ordered different special greeting messages each time an incoming call is received from said caller.

9. The method of claim 6 further comprising the steps of: storing a plurality of different special greeting messages for said caller, said plurality of different special greeting messages being sequentially ordered, each with a date/time stamp; playing one of said sequentially ordered different special greeting messages chosen according to said date/time stamp.

10. The method of claim 6 wherein said special greeting message is not played after a certain date/time.

11. The method of claim 10 wherein a particular special greeting message is erased after a certain date/time.

12. The method of claim 6 wherein said remote computer accesses a webpage to download said special message.

* * * * *